POLYBINARY TECHNIQUES

Filed Jan. 17, 1964 2 Sheets-Sheet 1

INVENTOR.
ADAM LENDER
BY
Lippincott, Ralls & Hendricson
ATTORNEYS

Aug. 22, 1967 A. LENDER 3,337,863

POLYBINARY TECHNIQUES

Filed Jan. 17, 1964 2 Sheets-Sheet 2

INVENTOR.

ADAM LENDER

BY

Lippincott, Ralls & Hendricson

ATTORNEYS

United States Patent Office 3,337,863

Patented Aug. 22, 1967

3,337,863
POLYBINARY TECHNIQUES

Adam Lender, Palo Alto, Calif., assignor, by mesne assignments, to Automatic Electric Laboratories, Inc., Northlake, Ill., a corporation of Delaware Filed Jan. 17, 1964, Ser. No. 338,445
12 Claims. (Cl. 340—347)

This invention relates to a polybinary transmission system, including method and apparatus for converting a conventional binary waveform into a polybinary waveform, and method and apparatus for converting the polybinary waveform back to binary. The term "polybinary" is defined herein as a waveform having at least four signalling levels, derived according to the teachings of this invention.

In the prior art, more than two discrete signalling levels are often employed in order to achieve a higher bit density per unit bandwidth. It is well known that the maximum number of transmittable bits per cycle of bandwidth is proportional to the $\log_2 b$, where $b$ is the number of discrete signalling levels. Each such discrete signalling level represents K binary digits, so that $b=2^K$. Multilevel systems, while providing an increase in transmittable bits, impose a penalty in the form of increased noise in the system. In addition to the expected decrease in signal-to-noise ratio as the number of levels is increased, additional decreases in reliability result from inter-symbol interference. This inter-symbol interference always increases exponentially as the number of signalling levels increases. For example, with a signalling rate equivalent to four binary channels ($K=4$ and $b=16$), the noise penalty due to the increased number of levels relative to conventional binary transmission is 17.5 db on the basis of the ratio of signal power per bit to noise power per cycle of bandwidth.

Moreover, with conventional multilevel transmission systems, the complexity of equipment required increases substantially as the signalling rate increases. For example, each time the signalling rate is doubled, the number of required shift register stages doubles, both at the transmitter and at the receiver. The number of binary slicers increases exponentially.

Still another important factor which must be considered before a decision can be made to increase signalling levels is the time factor. An appreciable time delay proportional to the number of binary digits represented by each signalling level is introduced in serial-to-parallel, and parallel-to-serial conversions. Such a time delay becomes important in many applications, particularly in the military.

Recognizing the shortcomings of the multilevel techniques of the prior art, a real desire has arisen in the industry for new techniques which permit more efficient digital communication at higher-order signalling levels.

The polybinary system of this invention provides a system for multilevel data transmission having appreciably better signal-to-noise ratios than those obtained in the prior art systems using the same number of signalling levels. Moreover, the inter-symbol interferences and the time delays encountered in the system of this invention are appreciably less than that normally encountered in systems of the prior art.

Before turning to the particular apparatus used to convert a binary waveform to a polybinary waveform, a brief theoretical description of a polybinary waveform is helpful. The continuous component of the spectral density of a simple binary waveform for NRZ (non-return to zero) binary digit is:

$$W_1(f)=\frac{1}{4T}|G(f)|^2 \qquad (1)$$

where T is the binary digit duration in seconds and $G(f)$ is the shaping factor of the individual pulses. For rectangular pulses:

$$G(f)=T\frac{\sin \pi fT}{\pi fT} \qquad (2)$$

and $$W_1(f)=\frac{T}{4}\left(\frac{\sin \pi fT}{\pi fT}\right)^2 \qquad (3)$$

Assume that a binary waveform with two signalling levels (MARK and SPACE) and a digital duration of T seconds is transformed into a waveform with $b$ signalling levels, also with a digital duration of T seconds.

The rules governing the $b$-level polybinary message are orderly in the sense that each digit is still unambiguously defined as a binary MARK or SPACE, depending upon its level. To arrive at such an unambiguous designation, the levels are numbered consecutively from the bottom, starting from zero, to $(b-1)$. All even-numbered levels are identified as SPACE and all odd-numbered levels are identified as MARK. Needless to say, these designations can easily be reversed to designate even-numbered levels as MARK and odd-numbered levels as SPACE. For the purposes of this discussion, the first-named convention above will be adhered to as follows:

SPACE=binary 0=even levels
MARK=binary 1=odd levels

For any given bandwidth, the number of binary channels represented by a $b$-level polybinary system is equal to $(b-1)$.

Briefly, the method of converting a conventional binary digital waveform into a $b$-level polybinary digital waveform wherein $b$ is an integer greater than three comprises the steps of:

(a) Combining the present binary pulse with the binary output pulse generated in the previous $(b-2)$ combinations of this step (a) and providing a binary output pulse of one polarity (binary 1, for example) if the number of binary ones in said combination is odd and a pulse of the opposite polarity (binary 0, for example) if the number of binary ones is even; and (b) Adding the successive $(b-1)$ binary output pulses from step (a) to obtain a multilevel polybinary output signal.

The polybinary waveform generated by the method described above may be readily compared with a conventional binary waveform. The waveform obtained in step (a) above is not yet a polybinary waveform; it is an intermediate waveform having the same probability for binary 1 and binary 0 as the original binary waveform, and therefore it has the same spectral density defined in Equation 1, above. The polybinary waveform obtained in step (b) above is the sum of $(b-1)$ successive binary digits from the waveform obtained in step (a). The spectral density of this polybinary waveform is thus:

$$W_2(f)=\frac{1}{4T}|G(f)|^2|1+e^{-j\omega T}+e^{-j2\omega T}+e^{-j3\omega T}+\ldots+e^{-j(b-2)\omega T}|^2 \qquad (4)$$

But, $$|1+e^{-j\omega T}+e^{-j2\omega T}+\ldots+e^{-j(b-2)\omega T}|^2=\left|\frac{1-e^{-j(b-1)\omega T}}{1-e^{-j\omega T}}\right|^2 \qquad (5)$$

Substituting (5) into (4):

$$W_2(f)=\frac{1}{4T}|G(f)|^2\left|\frac{1-e^{-j(b-1)\omega T}}{1-e^{-j\omega T}}\right|^2 \qquad (6)$$

For rectangular pulses of the polybinary waveform:

$$G(f)=\frac{\sin \pi fT}{\pi fT} \quad (7)$$

Also, $$|1-e^{-j\alpha\omega T}|^2=\left|2\frac{\sin \alpha\omega T}{2}\right|^2 \quad (8)$$

Substituting Equation 7 into Equation 6, and using the identity of Equation 8, for a polybinary spectrum:

$$W_2(f)=\frac{(b-1)^2T}{4}\left[\frac{\sin (b-1)\pi fT}{(b-1)\pi fT}\right]^2 \quad (9)$$

Comparison of the binary spectrum of Equation 3, above, and the polybinary spectrum of Equation 9, having $b$ levels, indicates that the polybinary spectrum is compressed by a factor of $(b-1)$. Equivalently, a $b$-level polybinary waveform represents $(b-1)$ binary channels over a fixed bandwidth.

A polybinary system requires appreciably less equipment in both transmitter and receiver than that required by the prior art comparable multilevel systems. An interesting comparison of the polybinary system with comparable prior-art multilevel systems is shown in Table I.

TABLE I

| Binary channels | Number of levels (prior art) | Polybinary levels $b$ | Number of slicers for polybinary | Number of slicers for prior art multilevel |
|---|---|---|---|---|
| 1 | 2 | 2 | 1 | 1 |
| 2 | 4 | 3 | 2 | 3 |
| 4 | 16 | 5 | 4 | 15 |
| 8 | 256 | 9 | 8 | 255 |
| 16 | $2^{16}$ | 17 | 16 | $2^{16}-1$ |
| 32 | $2^{32}$ | 33 | 32 | $2^{32}-1$ |

From the above table, the appreciable equipment reduction achieved in a polybinary system is evident.

Still another advantage of the polybinary system is that a change of more than one step at a time is not possible (from one level to the next adjacent level). With a conventional multilevel system, on the other hand, this is not the case. Consequently, the inter-symbol interference which is increased by multiple level changes is substantially less than encountered in the prior art.

The resultant noise increase with an increase in the number of signalling levels can be approximately deduced and compared for a polybinary system and a comparable prior art multilevel system. For a $b$-level multilevel system, the noise penalty relative to a binary system is:

$$20 \log_{10}(b-1) \text{ db} \quad (10)$$

The signal-to-noise ratio is signal power per bit divided by noise power per cycle of bandwidth. As $b$ goes up, the signal power per bit goes down, since more than one binary channel is transmitted over a fixed bandwidth. Recalling that in a polybinary system, the number of polybinary levels goes up linearly with increase in channel capacity whereas in a conventional multilevel system the number of levels goes up exponentially with increasing channel capacity, the following rules are obtained for the number of levels $b$ necessary to accommodate K binary channels over fixed bandwidth:

For polybinary $$b=K+1 \quad (11)$$

and for conventional multilevel $$b=2^K \quad (12)$$

Substituting Equations 11 and 12 in Equation 10, and subtracting from each 10 $\log_{10}$K db, to normalize the signal-to-noise ratios, the noise penalty turns out to be:

$$10 \log_{10}{}^{K2}-10 \log_{10}{}^{K} \text{ db (for polybinary)} \quad (13)$$

and $$10 \log_{10}(2^K-1)^2-10 \log_{10}{}^{K} \text{ db (for conventional multilevel)} \quad (14)$$

The above represents the noise penalties for a polybinary system and a conventional multilevel system, relative to a binary system, and may be simplified to become the following:

$$10 \log_{10}{}^{K} \text{ db (for polybinary)} \quad (15)$$

and $$10 \log_{10}\frac{(2^K-1)^2}{K} \text{ db (for conventional multilevel)} \quad (16)$$

While appreciating that the above comparison is approximate, since inter-symbol interference is neglected, the approximations tend to make the conventional system look better, so that the polybinary system is actually better, relatively, than the approximations show. It must be remembered that inter-symbol interference is greater in the conventional multilevel system than in the polybinary system of this invention. From Equations 15 and 16 above, in a four-channel ($K=4$) system, for example, the noise penalty in a polybinary system is 6 db, while in a conventional multilevel system it is 17.5 db, both as compared to a straight binary system. The details of the polybinary system of this invention, and the apparatus used for conversion of a binary waveform to polybinary, and reconversion from polybinary to binary, are best seen in the more detailed description which follows. This detailed description makes reference to the following drawings, in which:

Figure 1:
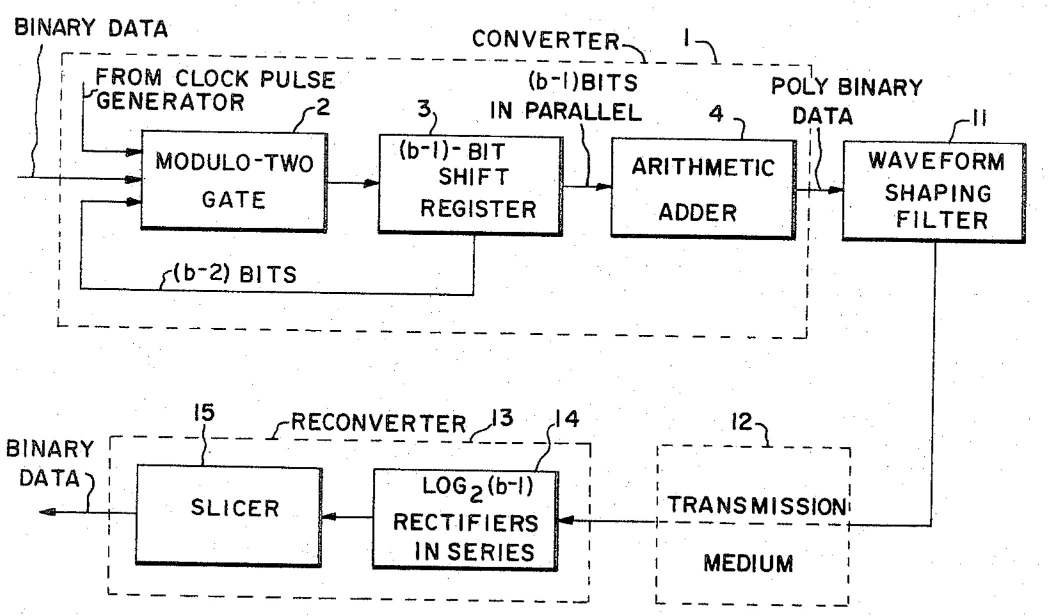
FIG. 1 is a block diagram of the polybinary transmission system of this invention.

Referring to FIG. 1, briefly, the apparatus of this invention for transmitting binary digital waveforms by converting them into polybinary digital waveforms includes converter 1. This converter 1 receives the binary data at its input and converts same to a polybinary waveform at is output. Converter 1 includes a combining means, such as modulo-two gate 2. Gate 2 combines the present binary pulse at its input with the binary output pulses generated at the previous $(b-2)$ combinations carried out in the combining means. Gate 2 provides a binary one output pulse if the number of binary ones in the combination is odd, and no output pulse (binary 0) if the number of binary ones is even. In other words, modulo-two gate 2 makes strictly binary decisions. If the total number of binary ones at its input (received from both the binary data and the $(b-2)$ steps of $(b-1)$ shift register 3) is even, gate 2 has no output (binary 0); if odd, it has an output pulse (binary 1). The input to modulo-two gate 2 from a conventional clock pulse generator (not shown) insures that the binary data enters the modulo-two gate in a synchronized manner.

The converter 1 also includes a remembering means, or $(b-1)$ bit shift register 3. The input of $(b-1)$ bit shift register 3 is connected to the output of modulo-two gate 2. The $(b-1)$ bit shift register remembers $(b-1)$ successive output pulses from the modulo-two gate. A $(b-1)$ bit shift register is a piece of apparatus well known in the art. The $(b-1)$ bit shift register is adapted to provide an output pulse from each bit denoting whether that bit is zero or one. The outputs remembering the previous $(b-2)$ combinations in the modulo-two gate 2 are connected to the input of the modulo-two gate 2, as shown. The outputs for the first $(b-2)$ bits of the register are thus fed back in parallel to modulo-two gate 2. For example, if $(b-1)$ bit shift register 3 is a 4-bit shift register, the first three bits from the first three flip-flops of the shift register are fed back to the modulo-two gate.

An adding means, e.g., arithmetic adder 4, is connected to each of the outputs from the $(b-1)$ bit shift register 3, corresponding to each of the $(b-1)$ previous binary output pulses from modulo-two gate 2. An arithmetic adder for $(b-1)$ bits can be, for example, $(b-1)$ resistors, one terminal of each being connected together to form the output terminal, and the other terminal of each being the separate inputs. The output signal from the arithmetic adder 4 is the desired $b$-level polybinary digital waveform.

Recalling that the last bit of the $(b-1)$-stage shift register 3 is not recycled to the modulo-two gate 2, a $(b-2)$-stage shift register may be substituted for the $(b-1)$-stage register 3. However, a second shift register having $(b-1)$ stages is then necessary to provide the proper input to arithmetic adder 4. The signals from this second shift register are passed to arithmetic adder 4, which in turn is connected to waveform shaping filter 11, as before. When two shift registers are so used, the second shift register, the arithmetic adder, and the shaping filter may all be approximated by a single L–C network. The electrical effect of such a combined unit on the input signal is approximately the same as the three separate components. The L–C filter employed is designed according to filter design principles well established in the art.

Figure 2:
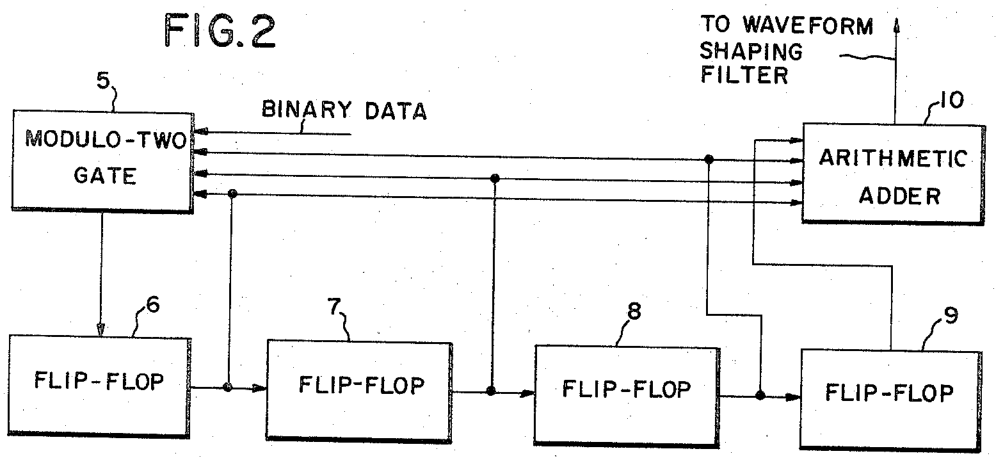
FIG. 2 is a block diagram of the binary-to-polybinary converter for a polybinary system wherein $b=5$.

Referring now to FIG. 2, a specific binary-polybinary converter is illustrated. This converter is applicable where $b=5$. Modulo-two gate 5 is the same as modulo-two gate 2 shown in FIG. 1. Flip-flops 6, 7, 8, and 9 together make up a 4-bit shift register. Flip-flops 6, 7, and 8 hold the first $(b-2)$ bits, and flip-flop 9 holds the $(b-1\text{th})$ (4th) bit. As shown in FIG. 2, the output of flip-flops 6, 7, and 8 holding the first three bits are all connected to the input of modulo-two gate 5. These outputs are also connected to arithmetic adder 10. Finally, the output of flip-flop 6 is connected to the input of flip-flop 7; the output of flip-flop 7 is connected to the input of flip-flop 8; and the output of flip-flop 8 is connected to the input of flip-flop 9. These connections are conventional for a cascaded flip-flop shift register. The output of flip-flop 9 is the terminal output of the shift register, and is connected only to arithmetic adder 10. Arithmetic adder 10 is connected to a waveform shaping filter such as filter 11 in FIG. 1.

Figure 3:
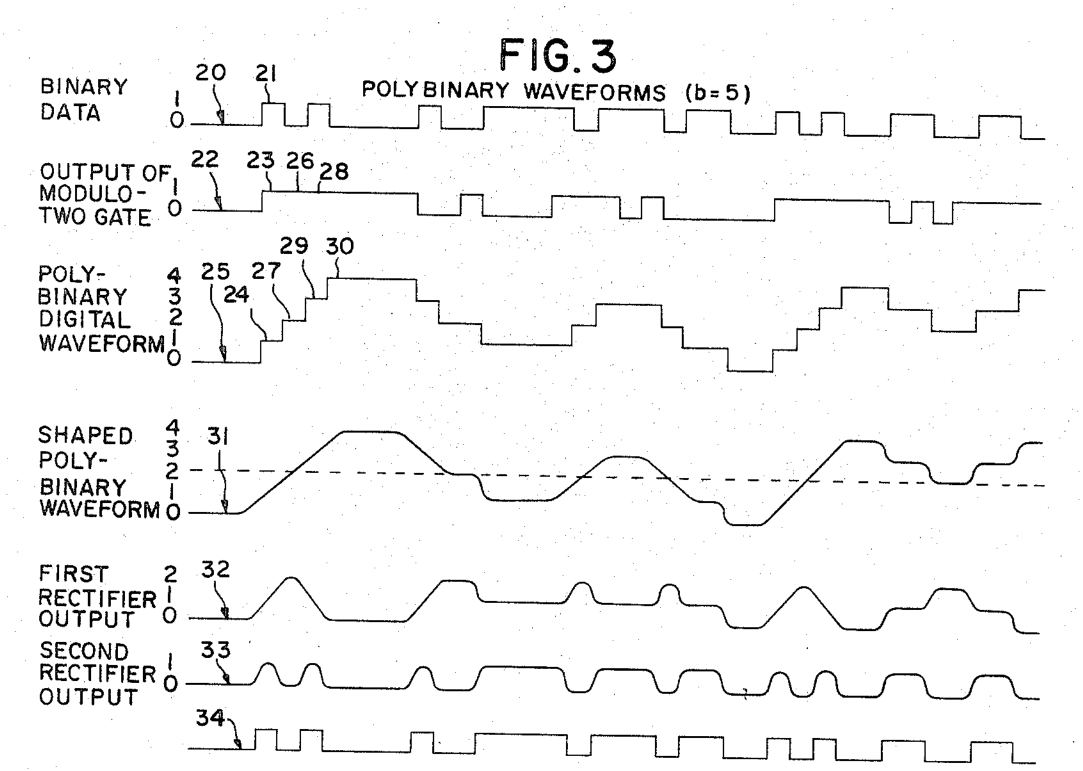
FIG. 3 shows a series of waveforms obtained in the conversion of a binary waveform to a polybinary waveform, and in the reconversion of the polybinary waveform into a binary waveform.

Making reference to the apparatus shown in FIG. 2, and to the graph of FIG. 3, the generation of a polybinary waveform can be explained. The binary data shown in waveform 20 appears as an input to the modulo-two gate 5. Let us assume (although it is not required) that all the flip-flops were set to zero prior to the input of the binary data. Let us further assume that this modulo-two gate 5 generates a zero output with an even number of ones, and a one ouput with an odd number of ones. During the first three input pulses (binary zeros) all the inputs to the modulo-two gate are zero. Since there are then zero ones, and since zero is an even number, the output of the modulo-two gate 5 will be zero. At the receipt of the first positive binary input pulse 21, modulo-two gate 5 will have three zero inputs (from flip-flops 6, 7, and 8) and a single one input from the binary data pulse which is a one. There are thus an odd number of ones appearing at the input to modulo-two gate 5. The output pulse of the gate is therefore a one, as shown in waveform 22 at pulse 23. This output pulse enters flip-flop 6 of the shift register, setting it to one. The output pulse from flip-flop 6 is the only one pulse passed to adder 10, causing it to provide a first-level output signal, shown as pulse 24 in waveform 25. Flip-flops 7 and 8 remain at zero.

The next binary pulse of binary pulse of binary waveform 20 is a zero. Flip-flop 6 is the only one containing a one, and this contributes the only one as an input to modulo-two gate 5. Again therefore the output of modulo-two gate 5 is a one, since there is an odd number of one inputs (one). This output of gate 5 is shown in waveform 22 as pulse 26. This output pulse form modulo-two gate 5 is pased to flip-flop 6, maintaining its setting at one. At the same time, the one previously contained in flip-flop 6 is passed to flip-flop 7, setting that flip-flop to one. Flip-flops 8 and 9 remain at zero. The ones in flip-flops 6 and 7 are both passed to adder 10. The two ones combine to cause the adder to provide a second level output pulse, shown as pulse 27 in waveform 25.

The next binary input to modulo-two gate 5 is a one. Since flip-flops 6 and 7 also contain ones, a total of three ones appear at the input to modulo-two gate 5. Since three is an odd number, the output from modulo-two gate 5 is again a one. This output pulse is shown as pulse 28 in waveform 22. This third output from modulo-two gate 5 passes to flip-flop 6, maintaining its setting at one. The one previously stored in flip-flop 6 passes to flip-flop 7, and the one previously stored in flip-flop 7 passes to flip-flop 8. The three ones in flip-flops 6, 7, and 8 combine in adder 10 to provide a third level output signal. This signal is shown as pulse 29 in waveform 25.

The fourth consecutive binary one at the output from modulo-two gate 5 is again passed to flip-flop 6 to maintain its setting at one. The one condition of flip-flop 6 passes a one pulse to flip-flop 7, which in turns passes a one pulse to flip-flop 8, which in turn sets flip-flop 9 at one. This puts a total of four ones into arithmetic adder 10, causing it to provide a fourth level output as shown as pulse 30 in waveform 25. The remainder of waveforms 22 and 25 are generated in the same manner, the details being left to the skill of the reader.

Referring now to FIGS. 1 and 2, the polybinary output signal in digital form from arithmetic adder 4 is passed to a waveform shaping filter 11. This shaping filter converts waveform 25 into a shaped waveform 31. Note that the general shape of waveform 31 is the same as waveform 25. However, the sharp corners of waveform 25 have been removed by the shaping filter, as is known in the art. The shaped waveform 31 may be detected and interpreted exactly as could the irregular waveform 25. However, a rounded waveform has a finite bandwidth, and is thus considerably easier to transmit on most conventional transmission systems.

The shaped polybinary waveform from converter 1 is then transmited over a conventional transmission medium 12 to reconverter 13. Suitable transmission media include carrier systems and the like. The reconverter is located in the receiver portion of the apparatus. The reconverter includes a means for sensing the level of the polybinary signal transmitted during each binary pulse interval. Such a sensing means ascertains whether the level of the received polybinary signal is an odd- or even-numbered level. In the embodiment of FIG. 1, the sensing means comprises, a plurality of full-wave rectifiers connected in series. This may be employed whenever $b$ is equal to $2^n+1$ where $n$ is an integer greater than one. The required number is equal to $\log_2 (b-1)$. The input of the first of these rectifiers is connected to receive the transmitted polybinary waveform. These rectifiers are represented by block 14.

The waveforms associated with the series-connected rectifiers 14 are shown in FIG. 3. Where $b=5$, the $\log_2$ of $(b-1)$ (i.e., 4) is two; therefore two series-connected rectifiers are required.

Waveform 31 is passed into the first of series-connected rectifiers 14. Each rectifier is set at a D-C level at the midpoint of the wave form which appears at its input. With waveform 31, this midpoint appears at the second level, as shown by the dotted line; the rectifier inverts the portion of waveform 31 above the dotted line, and the resulting waveform is shown as waveform 32. This waveform is then passed through the second of the series-connected rectifiers. This second rectifier is set at the middle or first level of waveform 32. The portion of the waveform above this first level is then inverted. The resulting waveform from the second rectifier is shown as waveform 33. This waveform turns out to be substantially the same as the input binary data waveform 20. However, the output of the second rectifier will still have rounded peaks. Since square peaks are desired, so that the output waveform is an exact duplicate of the input binary data, the waveform 33 emergent from the series-connected rectifiers 14 is passed through a slicer 15. Slicer 15 in the embodiment of FIG. 1 serves as a means to indicate that a binary pulse of one polarity corresponds to a polybinary pulse of the transmitted polybinary waveform when an odd-numbered level is sensed; and as a means to indicate that a binary pulse of the opposite polarity corresponds to the polybinary pulse of the transmitted binary waveform when an even-numbered level is sensed. The resulting waveform is shown in FIG. 3 as waveform 34. This waveform is an exact duplicate of binary input waveform 20.

Figure 4:
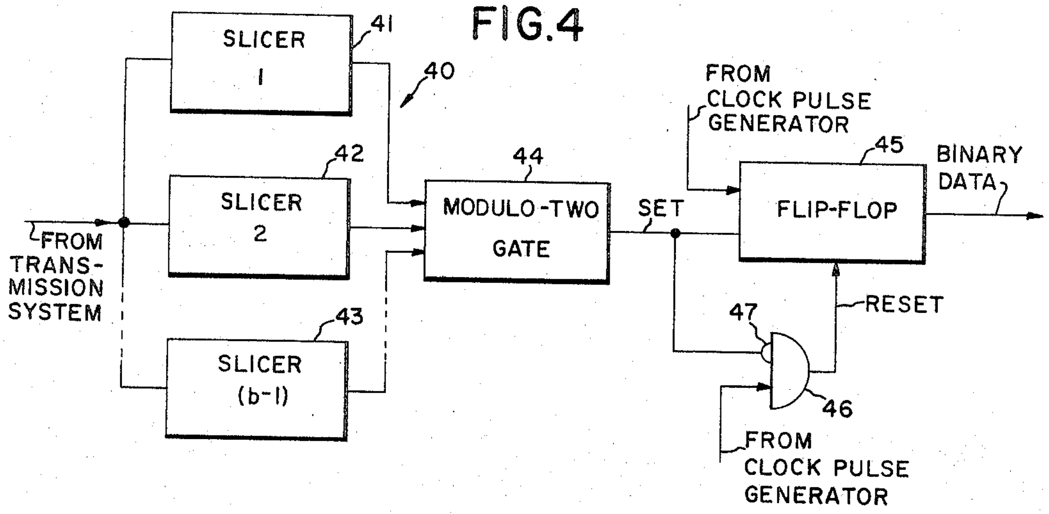
FIG. 4 is a block diagram of one embodiment of the polybinary-binary reconversion apparatus of this invention.

Another embodiment of the reconverter of this invention is shown in FIG. 4. This embodiment is applicable for any value at $b$, odd or even. The means for sensing the level of the polybinary signal transmitted during each binary pulse interval is a plurality of slicers 40 connected in parallel. A total of $(b-1)$ slicers is needed for a polybinary waveform of $b$ possible levels. The outputs of all these slicers are connected to the input of modulo-two gate 44. The plurality of slicers 40, together with modulo-two gate 44, provides the means for sensing the level of the polybinary signal transmitted during each binary pulse interval to ascertain whether that level is an odd- or even-numbered level. When that level is an odd-numbered level in the embodiment of FIG. 4, an odd-number of slicers will have a binary one output, and therefore modulo-two gate 44 will provide a one output pulse. Flip-flop 45 provides a means of indicating that a binary pulse of one polarity, e.g., a "one," corresponds to a polybinary pulse of the transmitted polybinary waveform when an odd-numbered level is sensed. The flip-flop also indicates that a binary pulse of the opposite polarity, e.g., a "zero," corresponds to a polybinary pulse of the transmitted polybinary waveform when an even-numbered level is sensed. The output pulses from modulo-two gate 44 are transmitted to the set input of flip-flop 45. These pulses are phased by pulses from a clock-pulse generator, as shown. When a zero pulse is received from modulo-two gate 44, coincident with a pulse from the clock pulse generator, AND-gate 46 will provide a pulse to the reset input of flip-flop 45. Therefore flip-flop 45 will provide a zero output pulse. The binary data emergent from the output of flip-flop 45 is therefore an exact reproduction of the input binary data. The output from modulo-two gate 44 is connected to AND-gate 46 through a conventional inhibitor 47, shown by its standard semi-circular symbol. AND-gate 46 is also phased with the data by pulses from a clock-pulse generator, as shown.

Another way of reconverting the polybinary waveform to binary utilizes a combination of full-wave rectifiers and slicers, each as discussed above. This method is applicable not only where $b=2^n+1$, as was the method using only full wave rectifiers, but also when $b$ is any odd integer not equal to $2^n+1$. In the latter case, full wave rectifiers are used for the conversion, as before, until the number of remaining levels is reduced to an even number. Then slicers are employed for the remainder of the reconversion in the same manner discussed above.

All of the individual circuit components such as flip-flops, AND-gates, modulo-two gates, slicer, shaping filters, and so on, are well known in the art. Other combinations of such components may be used to achieve the same binary-polybinary conversions and polybinary-binary reconversions carried out in the specific embodiments of the apparatus illustrated. However, the illustrated embodiments are merely representative and are not intended to limit the scope of this invention. Therefore the only limitations to be placed upon that scope are those expressly stated in the claims which follow.

What is claimed is:

1. A method for transmitting binary digital waveforms by converting said waveforms into polybinary digital waveforms having $b$ signalling levels, $b$ being an integer greater than three, which method comprises the steps of:

(a) combining the present binary pulse with the binary output pulse generated in the previous $(b-2)$ combinations of this step (a), and providing a binary output pulse of one polarity if the number of binary ones in said combination is even, and of the opposite polarity if the number of binary ones is odd; and (b) adding $(b-1)$ successive binary output pulses from step (a) to obtain a polybinary output signal;

(c) transmitting said polybinary waveform through a transmission medium to a receiver;

(d) at said receiver, sensing the level of said polybinary signal during each pulse interval to ascertain whether that level is odd-numbered or even-numbered;

(e) indicating the receipt of a binary pulse of one polarity when an odd-numbered level is sensed; and (f) indicating the receipt of a binary pulse of the opposite polarity when an even-numbered level is sensed.

2. A method for converting a binary digital waveform into a polybinary digital waveform having $b$ signalling levels, $b$ being an integer greater than three, which method comprises the steps of:

(a) combining the present binary pulse with the binary output pulses generated in the previous $(b-2)$ combinations of this step (a), and providing a binary output pulse of one polarity if the number of binary ones in said combination is even, and of the opposite polarity if the number of binary ones is odd; and (b) adding $(b-1)$ successive binary output pulses from step (a) to obtain a polybinary output signal.

3. Apparatus for converting a binary digital waveform into a polybinary digital waveform having $b$ signalling levels, $b$ being an integer greater than three, which apparatus comprises:

(a) a combining means for combining the present binary pulse with the binary output pulses generated in $(b-2)$ successive combinations carried out in said combining means, said combining means providing a binary output pulse of one polarity if the number of binary ones in said combination is even, and of the opposite polarity if the number of binary ones is odd;

(b) a remembering means connected to the output of said combining means, said remembering means having its outputs remembering the said successive combinations connected to the input of said combining means;

(c) a means for adding $(b-1)$ successive binary output pulses from said combining means to obtain a polybinary output signal to be transmitted;

(d) a means for sensing the level of the polybinary signal transmitted during each pulse interval to ascertain whether that level is odd-numbered or even-numbered;

(e) a means indicating a binary pulse of one polarity corresponds to the polybinary pulse of said transmitted polybinary waveform when an odd-numbered level is sensed; and (f) a means indicating a binary pulse of the opposite polarity corresponds to the polybinary pulse of said transmitted polybinary waveform when an even-numbered level is sensed.

4. Apparatus for converting a binary digital waveform into a polybinary digital waveform having $b$ signalling levels, $b$ being an integer greater than three, which apparatus comprises:

(a) a combining means for combining the present binary pulse with the binary output pulses generated in $(b-2)$ successive combinations carried out in said combining means, said combining means providing a binary output pulse of one polarity if the number of binary ones in said combination is even, and of the opposite polarity if the number of binary ones is odd;

(b) a remembering means connected to the output of said combining means, said remembering means having its outputs remembering the said $(b-2)$ successive combinations connected to the input of said combining means; and (c) a means for adding the $(b-1)$ successive binary output pulses from said combining means to obtain a polybinary output signal.

5. Apparatus for converting a binary digital waveform into a polybinary digital waveform having $b$ signalling levels, $b$ being an integer greater than three, which apparatus comprises:

(a) a modulo-two gate for combining the present binary pulse with the binary output pulses generated in $(b-2)$ successive combinations carried out in said modulo-two gate, said modulo-two gate providing a binary output pulse of one polarity if the number of binary ones in said combination is even, and of the opposite polarity if the number of binary ones is odd;

(b) a remembering means connected to the output of said modulo-two gate, said remembering means having its outputs remembering the said $(b-2)$ successive combinations connected to the input of said modulo-two gate; and (c) a means for adding the $(b-1)$ successive binary output pulses from said modulo-two gate to obtain a polybinary output signal.

6. Apparatus for converting a binary digital waveform into a polybinary digital waveform having $b$ signalling levels, $b$ being an integer greater than three, which apparatus comprises:

(a) a modulo-two gate for combining the present binary pulse with the binary output pulses generated in the $(b-2)$ successive combinations carried out in said modulo-two gate, said modulo-two gate providing a binary output pulse of one polarity if the number of binary ones in said combination is even, and of the opposite polarity if the number of binary ones is odd;

(b) a remembering means connected to the output of said modulo-two gate, said remembering means having its outputs remembering the said $(b-2)$ successive combinations connected to the input of said modulo-two gate; and (c) an arithmetic adder for adding $(b-1)$ successive binary output pulses from said modulo-two gate to obtain a polybinary output signal.

7. The apparatus of claim 6 further defined by said arithmetic adder comprising $(b-1)$ resistors, one terminal of each being the inputs and the other terminals being connected together as the output.

8. Apparatus for converting a binary digital waveform into a polybinary digital waveform having $b$ signalling levels, $b$ being an integer greater than three, which apparatus comprises:

(a) a modulo-two gate for combining the present binary pulse with the binary output pulses generated in $(b-2)$ successive combinations carried out in said modulo-two gate, said modulo-two gate providing a binary output pulse of one polarity if the number of binary ones in said combination is even, and of the opposite polarity if the number of binary ones is odd;

(b) a remembering means coupled to the output of said modulo-two gate for remembering the $(b-1)$ previous output pulses from said modulo-two gate, said remembering means having separate outputs remembering the said $(b-2)$ successive combinations;

(c) a means for coupling said separate output from said remembering means to the input of said modulo-two gate;

(d) a means for adding the output pulses from said remembering means corresponding to each of the $(b-1)$ successive combinations in said modulo-two gate to obtain a polybinary digital waveform output signal; and (e) a means for coupling the binary output pulses from said remembering means corresponding to each of $(b-2)$ successive combinations in said modulo-two gate to said adding means, said adding means thereby providing as its output the corresponding polybinary digital waveform.

9. Apparatus for converting a binary digital waveform into a polybinary digital waveform having $b$ signalling levels, $b$ being an integer greater than three, which apparatus comprises:

(a) a modulo-two gate for combining the present binary pulse with the binary output pulses generated in the $(b-2)$ successive combinations carried out in said modulo-two gate, said modulo-two gate providing a binary output pulse of one polarity if the number of binary ones in said combination is even, and of the opposite polarity if the number of binary ones is odd;

(b) a $(b-1)$ bit shift register having separate outputs for each bit;

(c) a means for coupling the output pulses from said modulo-two gate to said shift register;

(d) a means for coupling the output pulses from said shift register corresponding to each of said $(b-2)$ successive combinations in said modulo-two gate to the input of said modulo-two gate;

(e) an arithmetic adder for adding $(b-1)$ successive output pulses from said shift register; and (f) a means for coupling the binary output pulses from said shift register corresponding to each of the successive $(b-1)$ combinations in said modulo-two gate to said adding means, said adding means thereby providing as its output the corresponding polybinary digital waveform.

10. Apparatus for interpreting a polybinary digital waveform having $b$ signalling levels, $b$ being an integer greater than three, derived from a combination of $(b-1)$ binary pulses, in order to reconstruct the corresponding binary digital waveform, which apparatus comprises:

(a) $(b-1)$ binary slicers connected in parallel, the input of each said slicer being connected to receive said polybinary digital signal, each slicer adapted to detect a different one of the $(b-1)$ possible levels of said polybinary digital waveform;

(b) a modulo-two gate connected to receive the output signals from all of said slicers; and (c) means indicating a binary pulse of one polarity in the reconstructed binary waveform when said modulo-two gate provides an output pulse of one polarity, and indicating a binary pulse of the opposite polarity in the reconstructed binary waveform when said modulo-two gate provides an output pulse of the opposite polarity.

11. The apparatus of claim 10 further defined by said indicating means being a flip-flop connected to provide an output signal of one level in response to a pulse from said modulo-two gate, and of the opposite level in response to a clock pulse in the absence of a pulse from said modulo-two gate.

12. Apparatus for interpreting a polybinary digital waveform having $b$ signalling levels, $b$ being an odd integer greater than three, in order to reconstruct the corresponding binary digital waveform, which apparatus comprises:

(a) a plurality of full wave rectifiers connected in series, the input of the first connected to receive said polybinary digital waveform;

(b) a plurality of binary slicers, the input of each said slicer being connected to receive the signal from the last of said rectifiers, each slicer adapted to detect a different one of the possible levels of the signal from said last rectifier;

(c) a modulo-two gate connected to receive the output signals from all of said slicers; and (d) a means indicating a binary pulse of one polarity in the reconstructed binary waveform when said modulo-two gate provides an output of one polarity, and indicating a binary pulse of the opposite polarity in the reconstructed binary waveform when said modulo-two gate provides an output pulse of the opposite polarity.

References Cited

UNITED STATES PATENTS

| | | | |
|---|---|---|---|
| 2,869,079 | 1/1959 | Staffin et al. | 332—11 |
| 3,035,258 | 1/1962 | Chasek | 340—347 |
| 3,072,332 | 1/1963 | Margopoulos | 235—154 |

MAYNARD R. WILBUR, *Primary Examiner.*

DARYL W. COOK, *Examiner.*

A. L. NEWMAN, W. J. KOPACZ, *Assistant Examiners.*